(12) United States Patent
Jak et al.

(10) Patent No.: US 7,742,034 B2
(45) Date of Patent: Jun. 22, 2010

(54) COLOR DISPLAY

(75) Inventors: Martin Jak, Eindhoven (NL); Gerben Johan Hekstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 747 days.

(21) Appl. No.: 11/570,938

(22) PCT Filed: Jun. 28, 2005

(86) PCT No.: PCT/IB2005/052133

§ 371 (c)(1),
(2), (4) Date: Dec. 19, 2006

(87) PCT Pub. No.: WO2006/003609

PCT Pub. Date: Jan. 12, 2006

(65) Prior Publication Data

US 2008/0291151 A1    Nov. 27, 2008

(30) Foreign Application Priority Data

Jul. 2, 2004   (EP) ................................. 04103153

(51) Int. Cl.
G09G 3/36    (2006.01)

(52) U.S. Cl. .................... 345/102; 345/96; 345/209; 345/690; 348/254; 348/259

(58) Field of Classification Search .............. 345/89, 345/102, 209, 690, 692, 88, 211–213, 96–100; 348/742, 760, 744, 259, 254
See application file for complete search history.

(56) References Cited

U.S. PATENT DOCUMENTS 5,079,544 A * 1/1992 DeMond et al. ............. 345/84
5,428,408 A * 6/1995 Stanton ...................... 348/742
6,252,636 B1 * 6/2001 Bartlett ...................... 348/743
6,828,954 B2 * 12/2004 Yoshihara et al. ........... 345/102
2001/0011967 A1   8/2001 Miyazaki et al.
2002/0089485 A1   7/2002 Youn
2002/0159002 A1   10/2002 Chang
2004/0070581 A1 * 4/2004 Hiraki et al. ................ 345/209

FOREIGN PATENT DOCUMENTS

| EP | 0658869 A2 | 6/1995 |
| EP | 0851691 A2 | 7/1998 |
| JP | 2002032049 A1 | 1/2001 |
| JP | 2001343952 A1 | 12/2001 |
| WO | WO2004032523 A1 | 4/2004 |

* cited by examiner

Primary Examiner—Henry N Tran

(57) ABSTRACT

A color display device comprises a plurality of picture elements (14), at least two light sources, having different radiance spectra and being activated alternately, and color selection means for generating, together with said light sources, primary colors in a color image (P1, P2). Each of a number of image information sets, each set being related to a color image (P1, P2) to be displayed, are divided into a first subframe (A1, A2), being picture element settings to be maintained during the operation of a first light source, and a second subframe (B1, B2), being picture element settings to be maintained during the operation of a second light source. The polarity of the picture elements (14) is, in an alternating manner, shifted between a first polarity (+) and a second polarity (−). The polarity is shifted in such manner that a first subframe (A1) and a subsequent first subframe (A2) are matched with different polarities (+, −) in order to avoid a polarization in the picture elements (14) which may result in slow response or other artifacts.

11 Claims, 5 Drawing Sheets

COLOR DISPLAY

FIELD OF THE INVENTION

The present invention relates to a color display device, for displaying a color image, comprising a liquid crystal light valve layer, having a plurality of picture elements arranged in an array, at least two light sources, having substantially different radiance spectra and being activated alternately, and color selection means for generating, together with said light sources, primary colors in said color image.

The present invention further relates to a method of controlling such a color display device.

BACKGROUND OF THE INVENTION

WO 2004/032523 A1 describes a color display device of the above-mentioned type in which each pixel is provided with three color filters, each being arranged in a sub-pixel, and uses two different selectable light sources, which are activated alternately. Thus it is possible to obtain six primary colors, primaries. This arrangement allows a wider aperture for each pixel and an improved color gamut as compared with a conventional arrangement, comprising a white backlighting arrangement and three filters (RGB) for each pixel. A problem with this display is, however, that it has a limited life length and that the response of the color display device when shifting from displaying one image to displaying another image is slow. In addition it has been found that this display has a significant flicker.

SUMMARY OF THE INVENTION

An object of the present invention is to provide a color display device in which the above-mentioned problems of the prior art are reduced or are substantially decreased and thus to provide a color display device having a low flicker, a long life and a quick response.

This object is achieved by a color display device, for displaying a color image, comprising a liquid crystal light valve layer, having a plurality of picture elements, arranged in an array, at least two light sources, having different radiance spectra and being activated alternately, and color selection means for generating, together with said light sources, primary colors in said color image, wherein the color display device comprises an image controller which is adapted to divide each of a number of image information sets, each set being related to a color image to be displayed, into a first subframe, being picture element settings to be maintained during the operation of a first light source, and a second subframe, being picture element settings to be maintained during the operation of a second light source, and a display controller which is adapted to receive the subframes sent by the image controller and to send light source control signals and picture element control signals to the light sources and to the picture elements respectively, the display controller further being adapted to, in an alternating manner, shift the polarity of the picture elements between a first polarity and a second polarity, being opposite to the first polarity, the image controller and the display controller being adapted to cooperate to send subframes and shift polarity in such manner that a first subframe and a subsequent first subframe are matched with different polarities.

An advantage with this color display device is that it avoids those problems of slow response and flicker which have been found to occur in the prior art color display devices. The invention thus provides a wide color gamut in combination with a long life and high quality image projection.

An advantage with the measure according to one embodiment of the invention is that it provides a simple and cost efficient way of avoiding that one polarity is constantly combined with the first subframe. Thus, for example, if subframes are generated at a frequency of 100 Hz the polarity should be shifted at a frequency of 50 Hz or 25 Hz or even slower. However, a too slow shifting of the polarity might cause a slow response in the color display device. The image displayed in conjunction with the first polarity does in practice not have a 100% identical intensity with the image displayed in conjunction with the second polarity. At extremely low frequencies of shifting the polarities, these small intensity differences between the first polarity and the second polarity could be observed by humans as a flicker. Thus the even number, with which the frequency of generating the subframes should be divided to obtain the frequency of shifting the polarity, is preferably 2, in order to avoid problems of slow response and flicker.

An advantage with the measure according to one embodiment of the invention is that it is possible to use a standard liquid crystal panel since the matching of the first subframe and the subsequent first subframe with different polarities is made by the image controller whereas the display controller may shift the polarity at the same frequency as the subframes are received from the image controller.

Another object of the present invention is to provide a method of controlling a display device, which method provides an improved response and a reduced flicker compared to the prior art methods.

This object is achieved by a method of controlling a color display device, for displaying a color image, comprising a liquid crystal light valve layer, having a plurality of picture elements, arranged in an array, at least two light sources, having different radiance spectra and being activated alternately, and color selection means for generating, together with said light sources, primary colors in said color image, wherein each of a number of image information sets, each set being related to a color image to be displayed, are divided into a first subframe, being picture element settings to be maintained during the operation of a first light source, and a second subframe, being picture element settings to be maintained during the operation of a second light source, the subframes then being converted into light source control signals and picture element control signals that are sent to the light sources and to the picture elements respectively, the polarity of the picture elements being shifted between a first polarity and a second polarity, being opposite to the first polarity, and wherein the polarity is shifted in such manner that a first subframe and a subsequent first subframe are matched with different polarities.

An advantage of this method is that it reduces the problems of slow response and thus provides a quicker response when the color display device changes from displaying one image to displaying another image. Additionally the method reduces the flicker and makes the display more agreeable to the user.

An advantage of the method according to one embodiment of the invention is that it ensures that a first subframe and a subsequent first subframe are matched with different polarities of the picture elements. This provides for low polarization in the picture elements and still a low energy consumption since the polarity is not shifted at a very high frequency.

An advantage with the measure according to one embodiment of the invention is that each picture element will be exposed to both polarities during every subframe. This provides for minimal polarization in the picture elements.

An advantage with the measure according to one embodiment of the invention is that an existing scheme for shifting polarities may be used due to the fact that polarization and slow response is avoided by instead varying the order in which subframes are sent.

An advantage with the method according to one embodiment of the invention is that slow response is avoided and flicker, which may be the result if the order in which subframes are sent is varied in an unsuitable way, is minimized.

These and other aspects of the invention will be apparent from and elucidated with reference to the embodiments described hereinafter.

BRIEF DESCRIPTION OF THE DRAWINGS

The invention will now be described in more detail with reference to the appended drawings in which.

DESCRIPTION OF PREFERRED EMBODIMENTS

Figure 1:
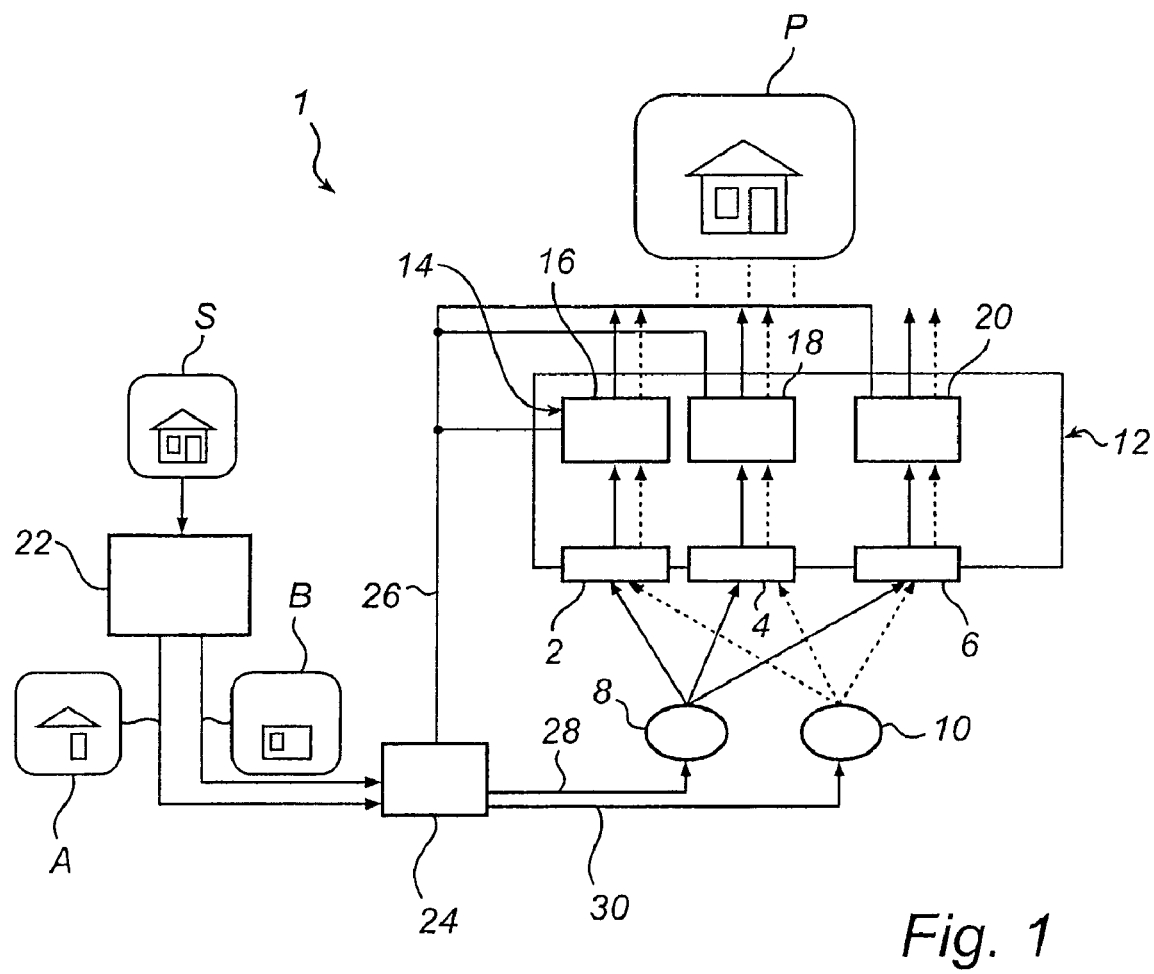
FIG. 1 shows diagrammatically a display device comprising a three sub-pixel color filter arrangement and two light sources.

FIG. 1 shows diagrammatically a transmissive display device 1. The display device 1 has three color filters 2, 4, 6, two selectable light sources 8, 10 able to emit light with different spectra, and a liquid crystal light valve layer 12 having a plurality of "light valves" in the form of picture elements, of which one picture element 14 having three sub-pixels 16, 18, 20 is shown in FIG. 1, that allow or prevent light from being transmitted depending on their respective settings. The transmissive display 1 further comprises an image controller and 22 and a display controller 24.

A set S, also called a frame, of information relating to a color image P that is to be displayed is sent from a source, such as a computer or a television receiver, to the image controller 22. The image controller divides the set of information S into a first subframe A and a second subframe B. The first subframe A relates to settings of the sub-pixels 16, 18, 20 to be used when activating the first light source 8 and the second subframe B relates to settings of the sub-pixels 16, 18, 20 to be used when activating the second light source 10. The first subframe A and the second subframe B are sent to the display controller 24. The display controller 24 converts the subframes A, B and sends picture element control signals 26 to the sub-pixels 16, 18, 20 and light source control signals 28, 30 to the light sources 8, 10 ordering the sub-pixels 16, 18, 20 to maintain settings according to subframe A simultaneously with the activation of the first light source 8 and subsequently ordering the sub-pixels 16, 18, 20 to maintain settings according to subframe B simultaneously with the activation of the second light source 10. It will be appreciated that new sets S will continuously be sent to the image controller 22 at a certain frequency regardless of if the image is a moving picture or a still.

Figure 2:
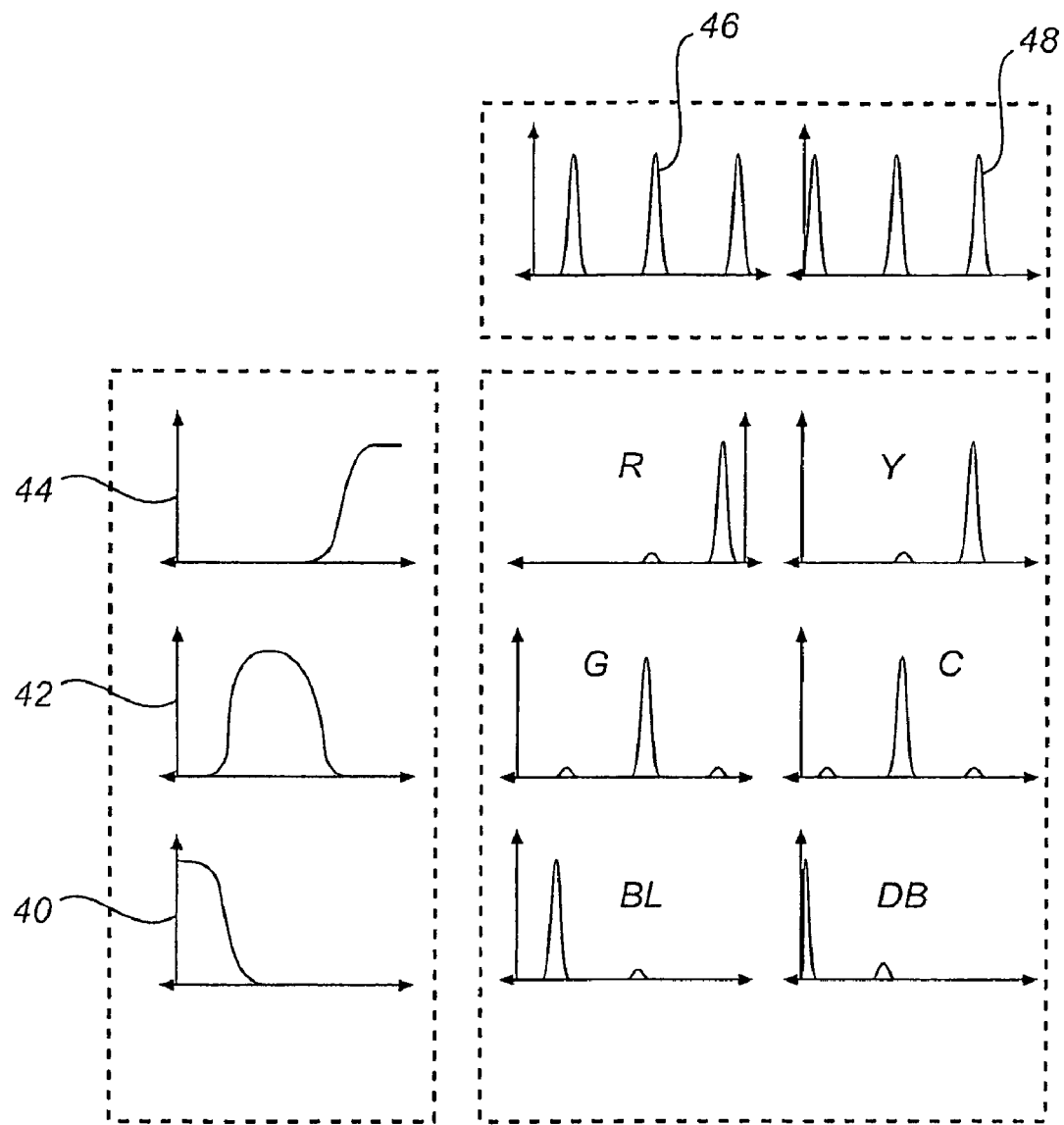
FIG. 2 shows diagrammatically a combination of color filters and spectra of light sources for obtaining a set of predetermined primary colors.

FIG. 2 indicates the principle of primary color selection with color filters, which is also described in WO 2004/032523 A1. FIG. 2 shows a combination of color filters and spectra emitted by the selectable light sources 8, 10, shown in FIG. 1, for obtaining a set of predetermined primary colors. The color filters 2, 4, 6, shown in FIG. 1, are conventional red, green and blue color filters having a transmittance spectra 40, 42, 44 respectively. The first light source 8 is able to emit light with a spectral distribution 46 with three different peaks in the red, green and blue wavelength range respectively. The second light source 10 is able to emit light with a spectral distribution 48 with three different peaks in the yellow, cyan and deep blue wavelength ranges respectively. A deep blue, in this application, means radiation with a wavelength range lower than the conventional blue wavelength range, but still visible. The combination of spectra 46, 48 of the light sources 8, 10 and the conventional red, green and blue color filter 2, 4, 6 yields two sets of primary colors. A first set consisting of red R, green G and blue BL; and a second set consisting of yellow Y, cyan C and deep blue DB, respectively. The specific scheme for alternately selecting the first and second light sources 8, 10 in combination with driving of the sub-pixels 16, 18, 20 of the display device 1 with image data corresponding to the primary colors red R, green G or blue BL of the selected first light source 8 or the primary colors yellow Y, cyan C or deep blue DB of the selected light source 10, enables a wide gamut display device 1.

Figure 3:
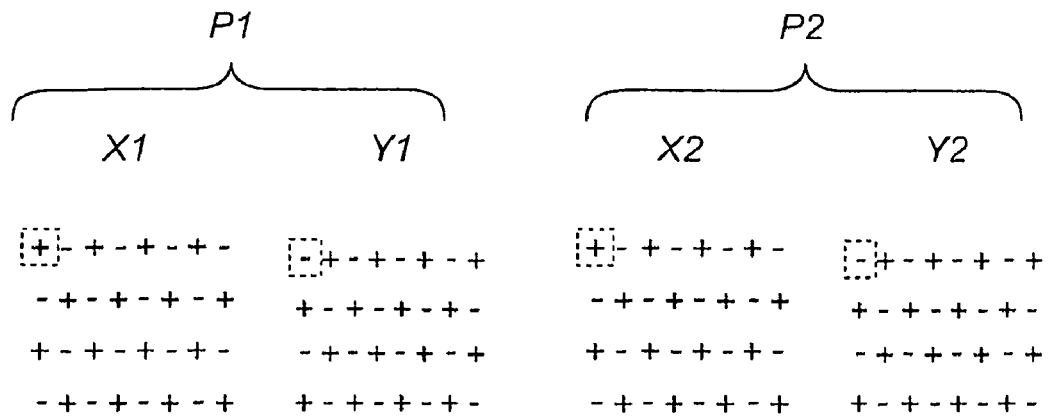
FIG. 3 shows an inversion scheme for a prior art display panel.

FIG. 3 indicates a so-called inversion scheme for picture elements of a prior art display panel. The liquid crystal display panel has a plurality of picture elements comprising liquid crystal molecules. The transmission of light through an actual picture element, and the color of that light, is controlled by applying an electrical field over each of the sub-pixels of each picture element according to a signal provided by a display controller in order to orient the liquid crystal molecules in a desired manner. A direct current (DC) electrical field applied to orient the liquid crystal molecules would however cause so called "image sticking". Image sticking relates to an artifact meaning that the picture elements tend to remain in one orientation for some time also after the electrical field has changed. Thus the image sticking causes a slow response when switching from displaying a first image to displaying another image since the first image tends to "stick" to the display panel for some time. Probably this is due to ions and other impurities moving under the influence of the electrical field thereby causing a more or less permanent polarization in the picture element. The polarization might even cause fatal damage to the picture element thereby reducing the life of the display device.

To avoid image sticking the electrical field applied to the picture element changes sign, negative/positive voltage, usually by applying an alternating current (AC) such that accumulation of ions in any part of the picture element is avoided. The orientation of the liquid crystal molecules, and thus the transmission of light of through the actual picture element, depends on the magnitude of the electrical field and not on the sign of the electrical field. The changing of the sign of the electrical field is called "inversion". FIG. 3 shows the sequence of a first subframe X1 and a second subframe Y1, containing image information relating to a first image P1, followed by a subsequent first subframe X2 and a subsequent second subframe Y2 containing image information relating to a second image P2, which may be the same as or different from the first picture P1, in a prior art display panel. The electrical field applied to the individual picture element is, in an alternating manner, changed between a positive field, represented by a "+", and a negative field, represented by a "−". In the inversion scheme shown in FIG. 3 there is always the same number of picture elements exposed to a positive field, "+", as are exposed to a negative field, "−". This type of inversion scheme is called a dot inversion scheme, since the polarity of each picture element, "dot", is shifted individually.

It has now been discovered that the prior art technique, represented in FIG. 3, provides a risk that slow response might occur, despite the inversion of the electrical fields, in a color display device of the type described in WO 2004/032523 A1. The reason for this has been found to be that the first subframes X1, X2 always coincide with one and the same inversion mode whereas the second subframes Y1, Y2 always coincide with the opposite inversion mode. Since the first subframes X1, X2 and the second subframes Y1, Y2 are not identical as regards the settings of the picture elements, at least not for all picture elements, there is a certain risk that some picture elements may be exposed to a high magnitude of the electrical field in the first subframes X1, X2 when the polarity is "+" and a low magnitude of the electrical field in the second subframes Y1, Y2 when the polarity is "−", and vice versa (a picture element has been marked by a dotted rectangle in FIG. 3 for ease of understanding). The net result of the fact that the magnitude of the electrical field for some picture elements is higher in one polarity than in the opposite polarity is that some of the picture elements are subjected to a net direct current (DC) build up causing a polarization in the picture element in spite of shifting the polarity. The problem, which may cause a slow response and decreased life just as the above mentioned "image sticking effect" and according to principles which to some extent resemble those of "image sticking", is enhanced in cases of showing a still since all first subframes X1, X2 are identical and all second subframes Y1, Y2 are identical. In addition to causing a slow response the prior art technique will also result in problems of flicker. The image displayed in conjunction with the first polarity does in practice not have a 100% identical intensity with the image displayed in conjunction with the second polarity. When the picture elements are exposed to a net direct current build up as described above the intensity difference between the two polarities has been found to increase and result in visible flicker.

Figure 4:
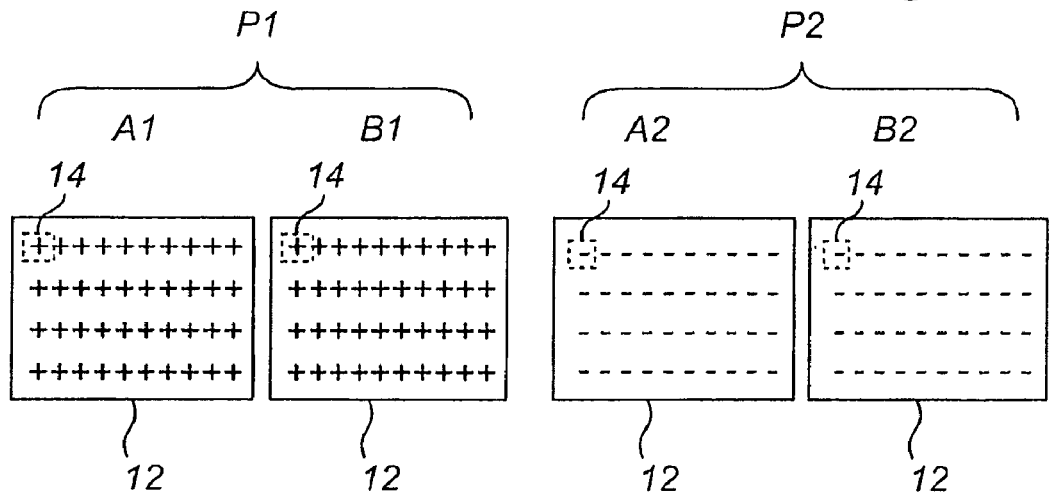
FIG. 4 shows an inversion scheme for a display panel according to a first embodiment of the invention.

FIG. 4 describes a first embodiment of the invention. In this embodiment the inversion scheme, which is sent by the display controller 24 in the signal 26 to the sub pixels 16, 18, 20, is modified in such a way that each picture element 14 of the liquid crystal light valve layer 12 maintains the same polarity, e.g. "+" during both a first subframe A1 and a second subframe B1 containing image information relating to a first image P1. Thus the polarity of each picture element 14 is changed half as frequent as the frequency at which a subframe A, B is sent, i.e. the frequency at which the polarity is shifted is equal to the frequency at which subframes are sent divided by 2. Thus the polarity is switched such that each picture element 14 has the opposite polarity, e.g. "−" during a subsequent set of subframes A2, B2 containing image information relating to a second image P2. Thus the problem of the prior art, where all first subframes may be displayed with the same polarity, e.g. "+" causing a risk of polarization and slow response, is avoided. In the inversion scheme shown in FIG. 4 all picture elements of the liquid crystal light valve layer 12 have the same sign. This is called a "field inversion scheme".

Figure 5:
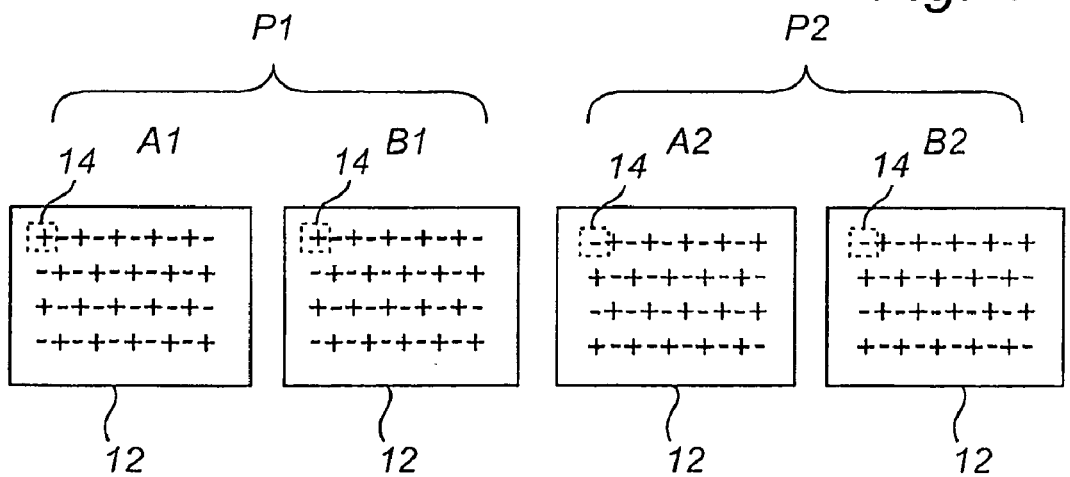
FIG. 5 shows an inversion scheme for a display panel according to a second embodiment of the invention.

FIG. 5 shows a second embodiment of the invention. In this embodiment a so called "dot inversion scheme" has been applied to the same principles as shown in FIG. 4, i.e. such that the picture elements of the liquid crystal light valve layer 12 changes polarity once every second subframe. In FIGS. 4 and 5 one picture element 14 has been marked for ease of understanding but it will be noted that for any specific picture element a first subframe A1 related to a first image P1 is combined with a first polarity and a subsequent first subframe A2 related to a second image P2 is combined with the opposite polarity.

It will be appreciated that many variants of the embodiments shown in FIG. 4 and FIG. 5 are possible. For example it is possible to instead shift the polarity, of the individual picture elements or of the entire liquid crystal light valve layer, already after the first subframe A1 and the keep the polarity constant during the second subframe B1 and the subsequent first subframe A2 and then shift the polarity again for the subsequent second subframe B2. The sequence would thus be, subframes with polarity of a specific picture element within brackets; A1(+)→B1(−)→A2(−)→B2(+).

Figure 6:
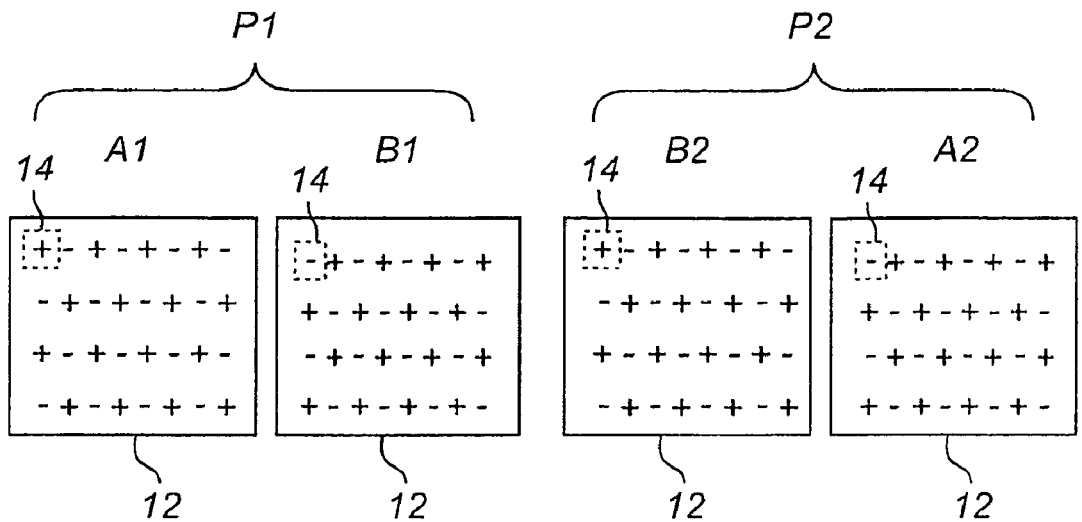
FIG. 6 shows an inversion scheme for a display panel according to a third embodiment of the invention.

FIG. 6 shows yet another embodiment of the invention. In this embodiment the order in which the subframes are sent have been modified. Instead of sending the subframes in the order A1B1-A2B2-A3B3 to provide image information related to first, second and third images, as is described with reference to FIG. 4 and FIG. 5, the image controller 22 sends the subframes in the order A1B1-B2A2-A3B3-B4A4. This means that for a first image P1 the first subframe A1 is sent first followed by the second subframe B1 for the first image P1. Then the second subframe B2 for a second image P2 is sent followed by the first subframe A2 for the second image P2. By using this inventive way of varying the order in which the first subframes A and the second subframes B are sent the inversion scheme used in the prior art, see FIG. 3, could be used without any problems of polarization in the picture elements and the resulting slow response since for any specific picture element 14 of the liquid crystal light valve layer 12 a first subframe A1 is combined with a first polarity and a subsequent first subframe A2 is combined with the opposite polarity.

Figure 7:
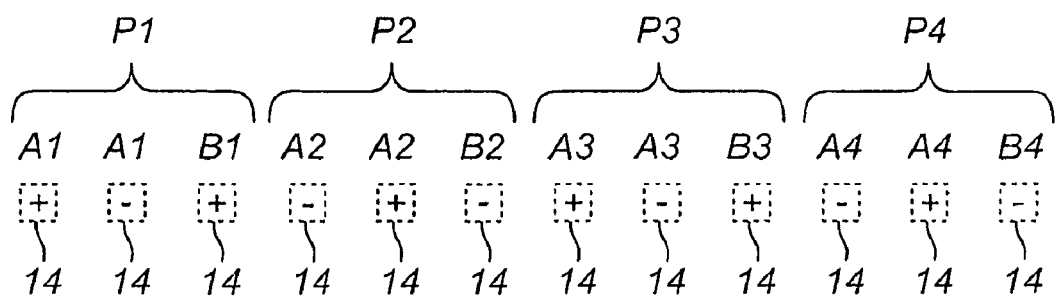
FIG. 7 shows an inversion scheme for a display panel according to a fourth embodiment of the invention.

FIG. 7 shows yet another embodiment of the invention. In this embodiment the first subframes A1, A2, A3 and A4 are, for every image P1, P2, P3, P4, sent twice while the second subframes B1, B2, B3, B4 are only sent once. The sequence for four images will thus be A1A1B1-A2A2B2-A3A3B3-A4A4B4. As indicated in FIG. 7, which shows the polarity of only one picture element 14 of the liquid crystal light valve layer, subframe A1, sent twice, will be sent at two different polarities. On average, over the whole sequence, half of all subframes A1, A2, A3, A4 will be sent at polarity "+" and half at polarity "−", the same is valid for the second subframes B1, B2, B3, B4.

Figure 8:
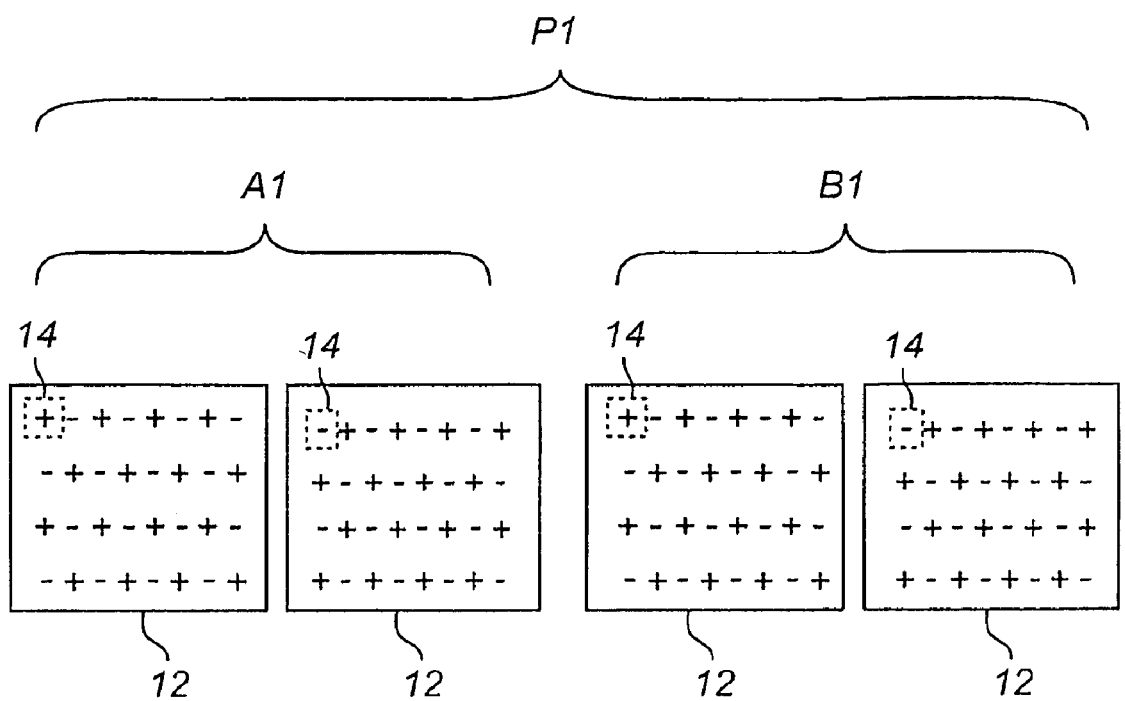
FIG. 8 shows an inversion scheme for a display panel according to a fifth embodiment of the invention.

FIG. 8 shows yet another embodiment of the invention. In this case the polarity of the picture elements is shifted at twice the frequency at which the first subframes A1 are sent to the display controller 22. Thus for the first subframe A1 corresponding to the first image P1 the polarity of a specific picture element 14 of the liquid crystal light valve layer 12 is first "+" and is then shifted to "−" before the second subframe B1 is sent. Thus both polarities, "+" and "−" are used during one subframe thereby effectively avoiding any direct current build up in the picture element. Thus a first subframe A1 and a subsequent first subframe A2 (not shown in FIG. 8) are both matched with different polarities. Further the first subframe A1 will end with a "−" polarity in the picture element 14 and a subsequent first subframe A2 (not shown in FIG. 8) will start with a "+" polarity, i.e. a different polarity, in that picture element 14. To some extent, however, this very quick shifting of polarity may cause an increased power consumption.

It will be appreciated that numerous variants of the above-described embodiments are possible within the scope of the appended patent claims.

For example in the embodiments shown in FIG. 4 and FIG. 5 the polarity is shifted at half the frequency at which subframes are sent to the image controller, i.e. the polarity is changed only after every two subframes. It will be appreciated that it is also possible to change the polarity of the picture elements only after every four, six, eight or any other even number of subframes. In such case, however, the picture element will have the same polarity for a prolonged time exposing it to some risk of polarization. Thus it is preferred to shift the polarity after every two subframes such as is indicated in FIG. 4 and FIG. 5.

In FIG. 4 and FIG. 5 it is indicated that polarity is shifted after a complete set of subframes, i.e. the sequence is, simplified:

A1→B1→shift polarity→A2→B2→shift polarity etc.

It will be appreciated that the shifting of polarity could also be made between the subframes of a set, i.e. according to a sequence of:

A1→shift polarity→B1→A2→shift polarity→B2 etc.

As regards the effect of avoiding a slow response these two variants are equivalent.

Above it is described that an image information set S is divided into a first subframe A and a second subframe B which is a preferred embodiment since it provides an improved color gamut and limited flicker. It will be appreciated, however, that it is also possible to divide the image information set into three subframes A, B, C if three light sources of different radiance spectra are available, or four or even more subframes as the case may be. In such cases the shifting of the polarities is adjusted accordingly so that each subframe, A, B, C, is matched with both polarities, "+" and "−", in an alternating manner. One alternative, for such a case of three subframes, would be to change polarity only after every three subframes.

To summarize a color display device comprises a plurality of picture elements 14, at least two light sources 8, 10, having different radiance spectra and being activated alternately, and color selection means 2, 4, 6 for generating, together with said light sources 8, 10, primary colors in a color image P1, P2. Each of a number of image information sets S, each set being related to a color image P1, P2 to be displayed, are divided into a first subframe A1, A2, being picture element settings to be maintained during the operation of a first light source 8, and a second subframe B1, B2, being picture element settings to be maintained during the operation of a second light source 10. The polarity of the picture elements 14 is, in an alternating manner, shifted between a first polarity (+) and a second polarity (−). The polarity is shifted in such mauler that a first subframe A1 and a subsequent first subframe A2 are matched with different polarities (+, −) in order to avoid a polarization in the picture elements 14 which may result in slow response or other artifacts.

The invention claimed is:

1. A color display device for displaying a color image, the color display device comprising:
    a liquid crystal light valve layer having a plurality of picture elements arranged in an array,
    at least two light sources having different radiance spectra and being activated alternately,
    color selection means for generating, together with said light sources, primary colors in said color image,
    an image controller which is adapted to divide each of a number of image information sets, each set being related to a color image to be displayed, into a first subframe, being multi-color picture element settings to be maintained during the operation of a first light source, and a second subframe, being multi-color picture element settings to be maintained during the operation of a second light source, and
    a display controller which is adapted to receive the subframes sent by the image controller and to send light source control signals and picture element control signals to the light sources and to the picture elements respectively; the display controller further being adapted to, in an alternating manner, shift the polarity of the picture elements between a first polarity and a second polarity, being opposite to the first polarity; the image controller and the display controller being adapted to cooperate to send subframes and shift polarity in such manner that a first subframe and a subsequent first subframe are matched with different polarities.

2. A color display device according to claim 1, wherein the display controller is adapted to shift the polarity of the picture elements at a frequency being equal to the frequency at which the image controller is sending the subframes to the display controller divided by an even number.

3. A color display device according to claim 1, in which the image controller is adapted to vary the order in which the subframes are sent to the display controller in such manner that a first subframe and a subsequent first subframe are matched with different polarities.

4. A method of controlling a color display device, for displaying a color image, comprising:
    providing a liquid crystal light valve layer, having a plurality of picture elements, arranged in an array,
    activating alternately at least two light sources, having different radiance spectra, and
    generating, together with said light sources, primary colors in said color image, wherein each of a number of image information sets, each set being related to a color image to be displayed, are divided into a first subframe, being multi-color picture element settings to be maintained during the operation of a first light source, and a second subframe, being multi-color picture element settings to be maintained during the operation of a second light source,
    converting the subframes into light source control signals and picture element control signals that are sent to the light sources and to the picture elements respectively, and
    shifting the polarity of the picture elements between a first polarity and a second polarity, being opposite to the first polarity, and wherein the polarity is shifted in such manner that a first subframe and a subsequent first subframe are matched with different polarities.

5. A method according to claim 4, wherein said shifting step further comprises shifting the polarity of the picture elements at a frequency equal to the frequency at which subframes are generated divided by an even number.

6. A method according to claim 4, wherein said shifting step further comprises shifting the polarity of the picture elements at a frequency being two times the frequency at which the first subframes are generated.

7. A method according to claim 4, further comprising varying the order in which the subframes are converted into picture element signals in such manner that a first subframe and a subsequent first subframe are matched with different polarities.

8. A method according to claim 7, wherein a first subframe followed by a second subframe, both relating to a first image, are immediately followed by a subsequent second subframe relating to a second image.

9. A method according to claim 7, wherein a first subframe and a subsequent first subframe relating to the same image are converted into respective picture element signals before a second subframe relating to that same image is converted into picture element signals.

10. A method according to claim 4, wherein said shifting step further comprises shifting the polarity of the individual picture elements of the liquid crystal light valve layer in such a manner that, at any given time, one half of the picture elements have the first polarity and the other half have the second polarity.

11. A color display device for displaying a color image, the color display device comprising:
- a liquid crystal light valve layer having a plurality of picture elements arranged in an array,
- exactly two light sources having different radiance spectra and being activated alternately,
- color selection means for generating, together with said light sources, primary colors in said color image,
- an image controller which is adapted to divide each of a number of image information sets, each set being related to a color image to be displayed, into a first subframe, being picture element settings to be maintained during the operation of a first light source, and a second subframe, being picture element settings to be maintained during the operation of a second light source, and
- a display controller which is adapted to receive the subframes sent by the image controller and to send light source control signals and picture element control signals to the light sources and to the picture elements respectively; the display controller further being adapted to, in an alternating manner, shift the polarity of the picture elements between a first polarity and a second polarity, being opposite to the first polarity; the image controller and the display controller being adapted to cooperate to send subframes and shift polarity in such manner that a first subframe and a subsequent first subframe are matched with different polarities.

* * * * *